(12) United States Patent
Mishima

(10) Patent No.: US 7,099,506 B2
(45) Date of Patent: Aug. 29, 2006

(54) IMAGE DATA CODING DEVICE, IMAGE DATA CODING METHOD, IMAGE FORMING APPARATUS, STORAGE MEDIUM AND PROGRAM

(75) Inventor: Nobuhiro Mishima, Osaka (JP)

(73) Assignee: Minolta Co., Ltd., Osaka (JP)

( * ) Notice: Subject to any disclaimer, the term of this patent is extended or adjusted under 35 U.S.C. 154(b) by 662 days.

(21) Appl. No.: 09/928,373

(22) Filed: Aug. 14, 2001

(65) Prior Publication Data

US 2002/0025068 A1 Feb. 28, 2002

(30) Foreign Application Priority Data

Aug. 24, 2000 (JP) ............... 2000-254557

(51) Int. Cl.
*G06K 9/00* (2006.01)
*G06K 9/36* (2006.01)
(52) U.S. Cl. .................. 382/166; 382/162; 382/167; 382/232; 358/1.9; 358/518
(58) Field of Classification Search ........ 382/166–167, 382/162, 232, 239, 245, 247, 248, 17, 16; 358/539, 462, 1.9, 518–523, 500; 345/604, 345/605, 590, 601; 375/240.02, 240.04
See application file for complete search history.

(56) References Cited

U.S. PATENT DOCUMENTS

| 5,146,328 | A | | 9/1992 | Yamasaki et al. | |
|---|---|---|---|---|---|
| 5,383,037 | A | * | 1/1995 | Kimura et al. | 358/539 |
| 5,767,991 | A | * | 6/1998 | Hara | 358/518 |
| 5,909,505 | A | * | 6/1999 | Katayama et al. | 382/164 |
| 6,024,018 | A | * | 2/2000 | Darel et al. | 101/365 |
| 6,144,763 | A | | 11/2000 | Ito | |
| 6,160,912 | A | * | 12/2000 | Usami | 382/167 |
| 6,437,792 | B1 | * | 8/2002 | Ito et al. | 345/600 |
| 2003/0043905 | A1 | * | 3/2003 | Nakayama et al. | 375/240.04 |
| 2003/0142110 | A1 | * | 7/2003 | Murashita | 345/600 |

FOREIGN PATENT DOCUMENTS

JP 10-215381 9/1998

\* cited by examiner

*Primary Examiner*—Jingge Wu
*Assistant Examiner*—Ali Bayat
(74) *Attorney, Agent, or Firm*—Buchanan Ingersoll & Rooney PC

(57) ABSTRACT

An image data coding device and the like capable of improving the compression ratio of entropy coding of color image data is disclosed. The image data coding device converts input color image data into color image data whose color is expressed by color data and brightness data each represented by multiple bits. Setting a value of color data that corresponds to an achromatic color at 00h as one example, the image data coding device converts the color data of the color image data into color data whose values are assigned in such a manner that the differences between these values and the value of the achromatic color data become larger as the distances away from the value of the achromatic color become larger. The image data coding device then performs entropy coding on the color image data.

16 Claims, 16 Drawing Sheets

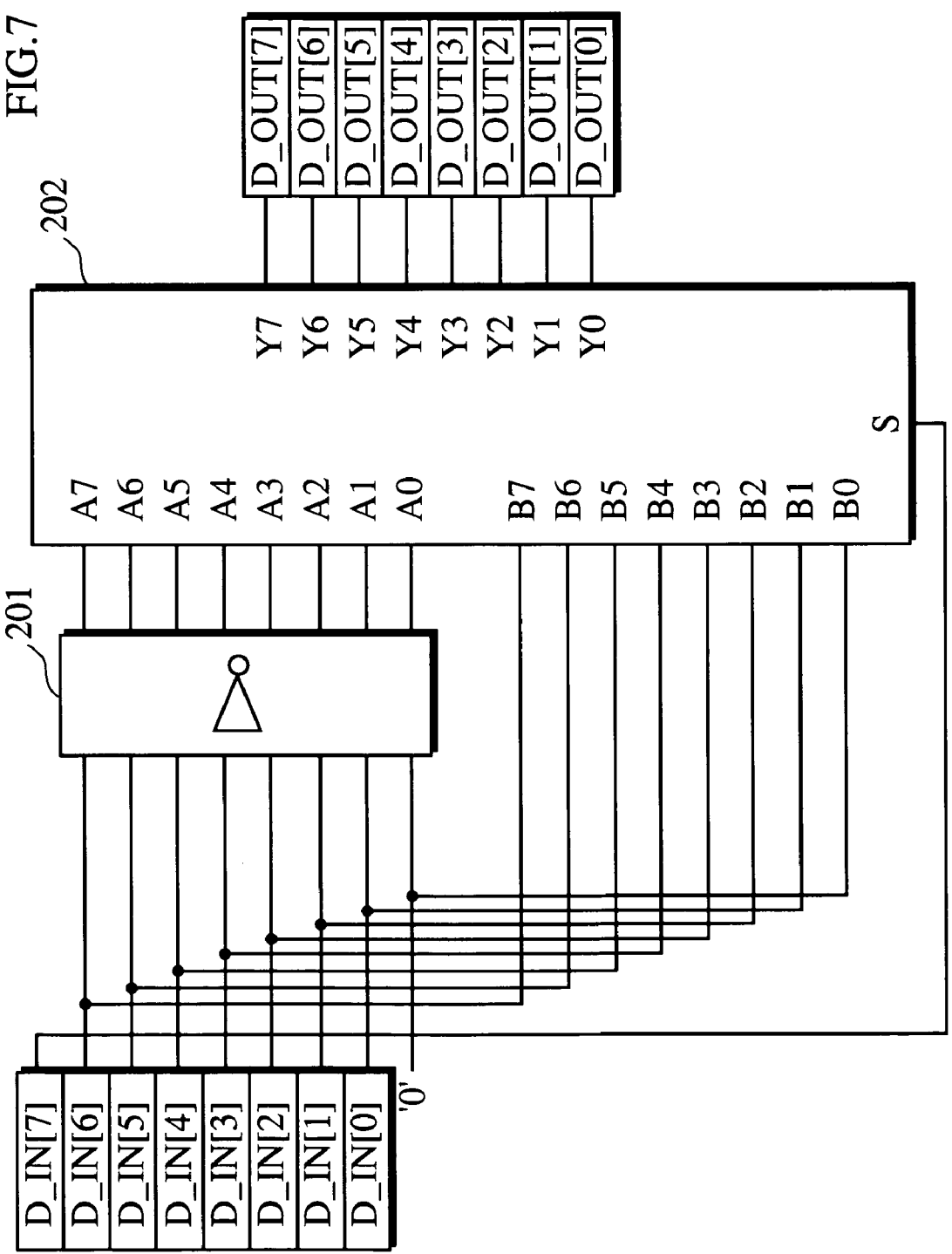

IMAGE DATA CODING DEVICE, IMAGE DATA CODING METHOD, IMAGE FORMING APPARATUS, STORAGE MEDIUM AND PROGRAM

This application is based on Patent Application No. 2000-254557 filed in Japan, the content of which is hereby incorporated by reference.

BACKGROUND OF THE INVENTION (1) Field of the Invention

The present invention relates to an image data coding device and an image data coding method for performing entropy coding on color image data, and to an image forming apparatus, a storage medium, and a program.

(2) Description of Related Art

In recent years, full-color image forming apparatuses that form full-color images have widely been put into practice. These full-color image forming apparatuses convert image data that correspond to three color components of R(red), G(green) and B(blue), for example, into image data whose color is expressed by brightness data and color data, each of which is represented by multiple bits. This kind of conversion is commonly called uniform color space conversion.

Examples of color systems for the color image data obtained using the uniform color space conversion are L*a*b* (hereafter, simply "Lab") and L*u*v* specified by CIE, and YCrCb. In these color systems, L* data and Y data are brightness data for expressing brightness, and a*b* data, u*v* data, and CrCb data are color data for expressing color including hue, chroma, and color difference using a coordinate system. The conversion into such color systems that express a color of an image by brightness data and color data described above enables the density of the image to be adjusted simply by adjusting the brightness data. In view of this advantage, these color systems are widely employed in the field of image forming apparatuses.

On the other hand, image forming apparatuses that handle digital image data usually store the digital image data once in a storage unit such as an image memory, and read the digital image data from the storage unit to form an image. However, providing a larger-capacity storage unit increases the production cost of such an image forming apparatus. Therefore, it is common to code digital image data so as to compress the data before storing it into the storage unit, thereby preventing data amount in the storage unit from increasing.

An example of an image data coding method widely used in the field of image forming apparatuses is so called "entropy coding". Examples of the entropy coding include arithmetic coding adopted by the Joint Bi-level Image Coding Experts Group (JBIG), and run-length coding, such as MH coding (Modified Huffman coding), MR coding (Modified READ coding), and MMR coding (Modified Modified READ coding). The entropy coding is to assign shorter code to a value that appears more frequently for reducing the entire code amount.

The following describes color image data coding, taking a color system of L*a*b* (hereinafter referred to as "Lab color system") for expressing image data by brightness data and color data as one example. FIG. 1 is for explaining an image data coding method and its color data expressive forms in the Lab color system.

In the Lab color system, each color is specified by a point on a three-dimensional coordinate system which takes brightness data (L*) on one axis, and color data (a and b*) respectively on the other two axes. Note here that the brightness data and the color data are each represented by eight bits. Note also that the coordinate axes are respectively referred to as "L", "a", and "b". Also, FIG. 1 assumes that coordinates for brightness data are on the axis that is perpendicular to the paper. In the figure, coordinates specifying color data in red and green directions ("a" coordinates) are on the horizontal axis, and coordinates specifying color data in yellow and blue directions ("b" coordinates) are on the vertical axis. The center "N" of the circle corresponds to achromatic color.

Typically, there are two types of expressive forms for values that show color data as shown in the figure. In the figure, the first expressive form (I) sets achromatic color at 00h (all 8 bits are 0), the maximum values in the red and yellow directions at 7Fh, and the maximum values in the green and blue directions at 80h. The second expressive form (II) sets the maximum values in the green and blue directions at 00h, and the maximum values in the red and yellow directions at FFh.

A conventional image data coding method is to perform the entropy coding, such as the arithmetic coding or the run-length coding, on color data expressed in one of forms (I) and (II) in pixel units, and then store the resulting data into a memory or the like.

However, an image forming apparatus such as a copying machine equipped with an image scanner that scans an original image using a plurality of CCD line sensors has the following problem. In such an image forming apparatus, the image scanner scans the original image by the CCD line sensors (hereafter, simply "line sensors") for three reference colors of (red), G (green), and B (blue), and generates image data corresponding to respective color components of R, G, and B. The Lab conversion is then performed on the generated image data of RGB colors (hereafter referred to as "RGB data") to obtain image data that can be expressed by the Lab color system (hereafter referred to as "Lab data"). The entropy coding is then performed on the obtained Lab data. Here, the problem lies in that there is a certain limit to the compression ratio of the Lab data expressed in either forms (I) or (II) that can be achieved using the entropy coding. The following describes this problem in more detail.

In the image scanner that scans the original color image using the line sensors for the three colors of R, G, and B, minute deviation might occur in the alignment of these line sensors. This may disturb the color balance of R, G, and detected by these line sensors in such a part where, e.g., colors change from white to black or vice versa. If this happens, the resulting RGB data might show a chromatic color in the part that is supposed to show an achromatic color (an example of this is disclosed in Japanese Laid-Open Patent Application No. 10-215381).

The RGB data showing a chromatic color means that color data showing the chromatic color will be produced when the RGB data is converted into Lab data. Referring now to FIG. 1, since a change from white to black, or black to white, is a change between achromatic colors, a shift should occur along the axis perpendicular to the paper (a change in brightness data) at the position of (position representing achromatic color) shown in the figure. However, when the color data showing the chromatic color is produced, there will be deviation in the value in the direction of the horizontal axis (a) or the vertical axis (b) from the position of N.

This deviation not only causes deterioration of the quality of the formed image, but also leads to decrease in the compression ratio of the image data coding. The reason for this can be considered as follows. In the entropy coding, the compression ratio normally increases with every increase in the proportion at which the same values are repeated. However, the deviation in the values of the color data described above decreases the proportion of the repeated data values.

For example, in the case of the form (I) in FIG. 1, the minimum value 00h for color data is adjacent to the maximum value FFh at the position of the aromatic color. Therefore, when deviation in color data occurs, a portion where 0 is repeated and a portion where 1 is repeated together constitute the bit sequence of the color data that is expressed by 8 bits per pixel. This causes decrease in the compression ratio of the entropy coding. While deviation in color data may occur in one direction (either red or green direction, or either yellow or blue direction), the deviation usually occurs in both directions. In the case of the form (I), in particular, the deviation in both directions causes significant decrease in the compression ratio.

The same problem also occurs in the case of the form (II), although it should be noted that the form (II) is not preferable in the first place. With the form (II), only a limited compression ratio can be achieved for a chromatic color data even when the RGB balance is not disturbed.

SUMMARY OF THE INVENTION

The object of the present invention is to provide improvements to an image data coding device and the like for coding color image data, by (a) obtaining the color image data whose color is expressed by a mixture of different color components, using a plurality of sensors for the color components and (b) converting the obtained color image data into image data such as Lab data whose color is expressed by brightness data and color data. More specifically, the object of the present invention is to provide an image data coding device that is capable of preventing drastic decrease in the compression ratio of the entropy coding when a balance of the color components is disturbed, and also that is capable of improving the compression ratio in other cases, and to provide an image data coding method, an image forming apparatus, a storage medium, and a program.

The above object of the present invention can be achieved by an image data coding device including: a data converting unit for converting color data that is contained in image data, into converted color data that corresponds to a difference from a reference color; and a coding unit for performing entropy coding on converted image data in which the color data has been converted by the data converting unit.

With this construction, the data converting unit converts color data into converted color data that corresponds to a difference from a reference color. Therefore, when the color data is subjected to entropy coding, the compression ratio of the entropy coding is not drastically decreased. Accordingly, the storage capacity of the storage unit can be utilized effectively.

The above object of the present invention can also be achieved by an image data coding device, including: an image data input unit for receiving input of first-type color image data; an image data converting unit for converting the input first-type color image data into second-type color image data that contains brightness data and color data, where a difference between a condition of the color data and a condition of data for a reference color corresponds to a difference between a color expressed by the color data and the reference color, the condition of the data for the reference color being set at maximum or minimum at least in a predetermined range including the reference color; and a coding unit for performing entropy coding on the second-type color image data.

With this construction, any type of color image data can be inputted into the color image input unit. Specifically, color image data such as RGB data whose color is expressed by a mixture of a plurality of color components, or color data such as Lab data whose color is expressed by brightness data and color data may be inputted.

A "reference color" may be set as an achromatic color, or may be determined according to a property of an image or the like. With setting the reference color as the achromatic color, the present invention is effective in such a case where an original document of a white colored recording sheet on which black colored characters are printed is scanned, as one example. Also, with setting the reference color according to the property of the image or the like, the present invention is further made effective in such a case where a colored recording sheet on which characters are printed is used.

According to the present invention, values of color data on which entropy coding is to be performed by the coding unit are set at such values that will prevent drastic decrease in the compression ratio of the entropy coding even when a balance of color components (for example, RGB) is disturbed. To be more specific, even when deviation in the values of the color data occurs due to the disturbed color balance, deterioration of the continuity of same values in multiple bits of color data or the like in entropy coding can be reduced, compared with a conventional case, thereby preventing drastic decrease in the compression ratio.

The reason for the use of the phrase "in a predetermined range including the reference color" above is as follows. To prevent drastic decrease in the compression ratio caused by the disturbed balance of a plurality of color components described above, only in such a range where chromatic color data might appear due to the deviation, color data needs to be set at an appropriate condition, out of the color data on which the entropy coding is to be performed. Also, the phrase "a difference between a condition of the color data and a condition of data for a reference color corresponds to a difference between a color expressed by the color data and the reference color" can be interpreted in various ways as follows. For example, a value of the data for the reference color (hereafter referred to as the "reference value") may be set at "0" (for example, all 8 bits are zero), and odd numbers and even numbers may be respectively assigned to the positive direction and the negative direction (or vice versa), in such a manner that larger numbers are assigned to larger distances away from the reference color (to be more specific, larger numbers are assigned to larger differences between the color that is expressed by the color data and the reference color when the color data is expressed in the form (II) in FIG. 1) as in preferred embodiments of the present invention which will be described later. Alternatively, a predetermined value may be set as the reference value, and numbers smaller than the predetermined value may be assigned monotonously in the positive and negative directions.

Alternatively, the reference value may be set at "0" or at a maximum value (all bits are 1), and values of the color data may be set in such a manner that bit-values of their multiple bits to express each pixel are changed in the following way. The number of bits showing a different bit-value is made to increase in the values of the color data, relative to the larger distances away from the reference color. Alternatively, the number of bits showing a different bit-value is the same but the arrangement of such bits in the values of the color data is changed. Therefore, as can be seen from the phrase "a difference between a condition of the color data and a condition of data for a reference color corresponds to a difference between a color expressed by the color data and the reference color", the difference between conditions include not only a difference between values, but also a difference between arrangements of the multiple bits. Therefore, the phrase "the condition of the data for the reference color being set at maximum or minimum" does not necessarily indicate a maximum value and a minimum value of the values expressed by the multiple bits. In the entropy coding, it is actually considered preferable to set the reference value at "0" or at the maximum value. However, there are various ways for the specific assignment of color data values. An optimum assignment of the color data values should be determined depending on an employed coding method or units of the entropy coding which will be described later (for example, in units of bit planes, or in units of a two-dimensional plane on which values are arranged, which will be described later)

Eventually, setting the condition of the reference value at "maximum or minimum" intends to avoid such cases where inversion occurs on bits of the reference value, and values of the color data adjacent to the reference value, as is the case with the form (I) in FIG. 1, or where values of the color data monotonously increase or decrease in the entire range of the color data, as is the case with the form (II) in FIG. 1. It is considered that the compression ratio can be improved with various methods, compared with the cases of the forms (I) or (II). However, particularly when "maximum or minimum" referred to therein are the minimum value or the maximum value of the color data values (as described in the preferred embodiments later), or a maximum value or a minimum value of the number of bits that each take a certain value (0 or 1), it is considered that the effect of the present invention can further be ensured.

As one example of the construction to perform the above described color image data conversion, the image data input unit may receive input of color image data whose color is expressed by a mixture of a plurality of color components as the first-type color image data, and the image data conversion unit may include (a) a unit for performing HVC conversion, Lab conversion, and the like, on the first-type color image data to generate third-type color image data, and (b) a unit for converting the third-type color image data into the second-type color image data.

With this construction, to code RGB data for example, the HVC conversion function conventionally provided in an image processing board for use in the image forming apparatus may effectively be utilized. However, this HVC conversion function may not be used in the present invention. Instead, the color image data such as RGB data may be directly, or without a typical HVC conversion process, converted into the second-type color data described above.

On the other hand, in the case where the above HVC conversion function is utilized, the use of the third-type image data resulting from the HVC conversion enables the reference color to be determined easily. Therefore, the use of the HVC conversion function is particularly preferable in the case where the reference color is changeable.

BRIEF DESCRIPTION OF THE DRAWINGS

These and other objects, advantages and features of the invention will become apparent from the following description thereof taken in conjunction with the accompanying drawings that illustrate a specific embodiment of the invention.

In the drawings:

FIG. 7 shows an example of a construction of the code conversion units 1031 and 1032 in the first embodiment;

DESCRIPTION OF THE PREFERRED EMBODIMENTS

The following describes preferred embodiments of an image data coding device and the like to which the present invention relates, with reference to the drawings.

Figure 2:
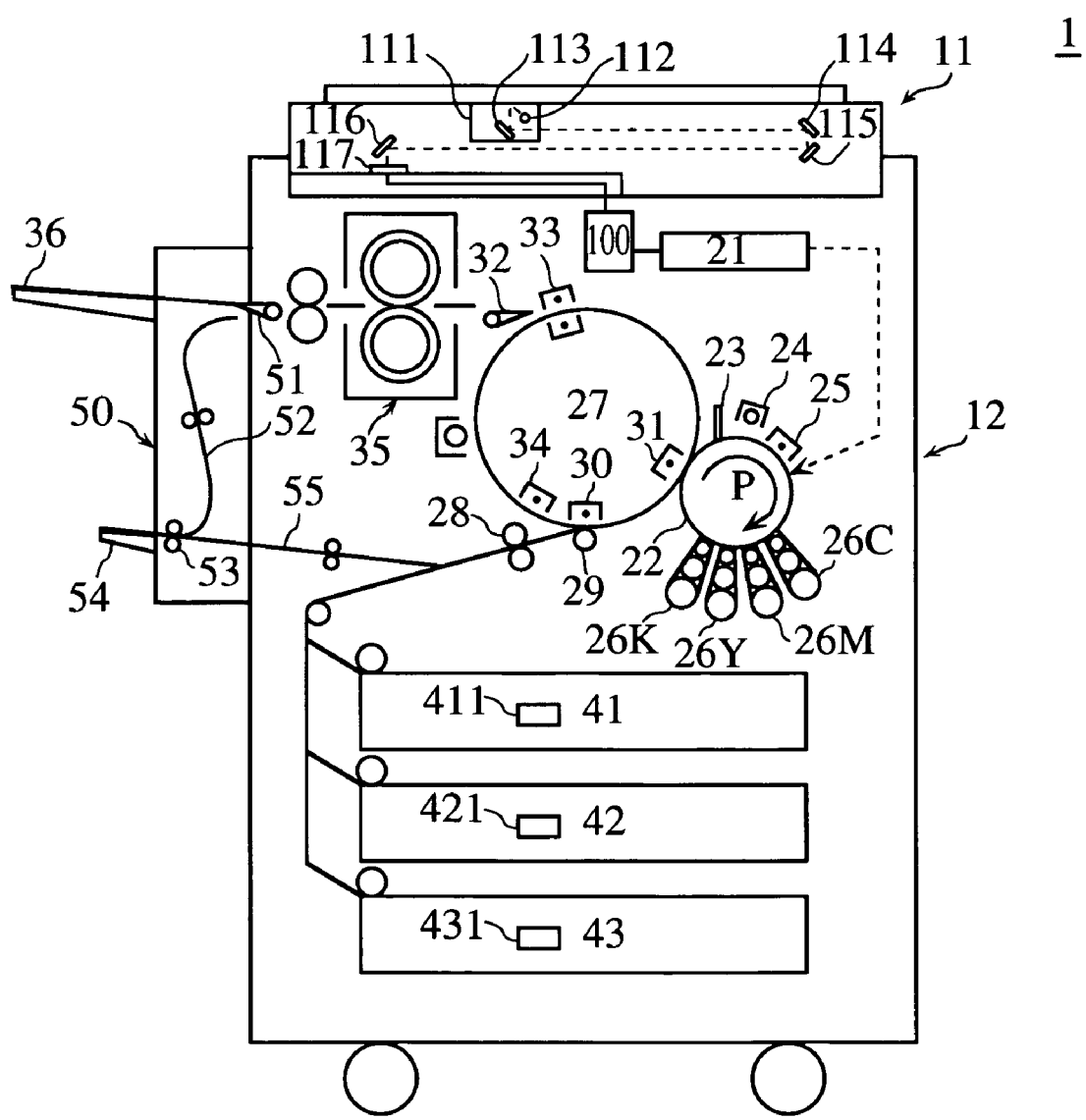
FIG. 2 is a simplified sectional view showing an overall construction of a copying machine 1 that relates to preferred embodiments of the present invention.

First Embodiment (1) Overall Construction of the Full-color Image Forming Apparatus The following describes the overall construction of a color copying machine (hereafter simply, "copying machine") as one example of the full-color image forming apparatus to which the present invention is applied. FIG. 2 is a simplified sectional view showing the overall construction of a copying machine 1 in the present embodiment. As shown in the figure, the copying machine 1 includes line sensors that correspond to respective colors of RGB. The copying machine 1 is roughly composed of an image scanning unit 11 and an image forming unit 12. The image scanning unit 11 scans an original document or the like and generates RGB color image data. The image forming unit 12 forms an image based on the RGB color image data generated by the image scanning unit 11.

The image scanning unit 11 is well-known, and scans an image of the original document or the like placed on a platen glass (not illustrated) by moving a scanner 111. Image information obtained by illumination of an exposure lamp 112 provided in the scanner 111 is focused on a line sensor 117 via reflective mirrors 113 to 116 and a condenser lens (not illustrated). The line sensor 117 converts the image information into electric signals corresponding to respective colors of R, G, and B. As a result of this, RGB data is obtained.

The RGB data obtained by the image scanning unit 11 is subjected to various data processes in a control unit 100 that includes an image data coding device relating to the present invention. The various data processes include encoding and decoding processes which will be described later. Through these processes, the RGB data is converted into image data of reproduction colors of cyan (C), magenta (M), yellow (Y), and black (K) (the reproduction colors of cyan, magenta, yellow, and black are hereafter respectively referred to as "C", "M", "Y", and "K", and components relating to these reproduction colors are respectively subscripted with these letters).

The control unit 100 transmits the image data of the respective reproduction colors to a print head unit 21, and drives a laser diode (LD) provided in the print head unit 21 to expose one of the reproduction colors C, M, Y, and on the surface of a photoconductive drum 22 rotating in the direction of arrow P.

The photoconductive drum 22 is charged uniformly by an initial charger 25 after residual toner on the surface of the photoconductive drum 22 is removed by a cleaner 23 and any surface potential remaining on the surface of the photoconductive drum 22 is neutralized by an eraser lamp 24. When the photoconductive drum 22 that has been uniformly charged is exposed as described above, an electrostatic latent image is formed on the surface of the photoconductive drum 22.

Toner developing units 26C to 26K respectively for the colors C, M, Y, and are synchronized with the rotation of the photoconductive drum 22. Only one of the developing units 26C to 26K for the one of the colors presently to be developed is driven, to develop the electrostatic latent image on the surface of the photoconductive drum 22.

A recording sheet (not illustrated) is fed from one of paper feed cassettes 41, 42, and 43 selected by a detection signal outputted from paper size detection sensors 411, 421, and 431 that are photoelectric sensors or the like, respectively provided in the paper feed cassettes 41, 42, and 43. Recording sheets of various sizes can be set in the paper feed cassettes 41, 42, and 43 such that A4-sized papers for the paper feed cassette 41, A3-sized papers for the paper feed cassette 42, and B4-sized papers for the paper feed cassette 43.

When the edge of the recording sheet reaches an absorption roller 29 after passing through a timing roller 28, the recording sheet is held by a chucking mechanism on a transfer drum 27 and absorbed electrostatically by an absorption charger 30, so that the recording sheet is rolled up in a state where it does not shift. A toner image developed onto the surface of the photoconductive drum 22 is transferred onto the recording sheet that has been rolled up on the transfer drum 27 by the transfer charger 31.

The printing process described above is repeated for each reproduction color of C, M, Y, and for making a full-color copy. When all the reproduction colors of the toner image are transferred, a separation nail 32, a neutralization charger 33 are operated to separate the recording sheet from the surface of the transfer drum 27.

The toner image transferred onto the recording sheet is in such an unstable condition that easily comes off. To fix the toner to the surface of the recording sheet, heat and pressure are applied to the recording sheet in a fixing unit 35. The recording sheet is then fed onto the paper tray 36. When a copy is also to be made onto the back side of the recording sheet (so called, two-sided copy), a switch nail 51 is operated to guide the recording sheet fed from the fixing unit 35 to a transport path 52 in a document reverse unit 50 located below, where a reverse roller 53 once pushes the recording sheet out in the direction of a reverse tray 54 and reverses the recording sheet upside down by the reverse roller 53 rolling the other way around, and then, the recording sheet is guided to a transport path 55. Following this, an image is formed on the back side of the recording sheet.

(2) Construction of the Image Data Coding Device

Figure 3:
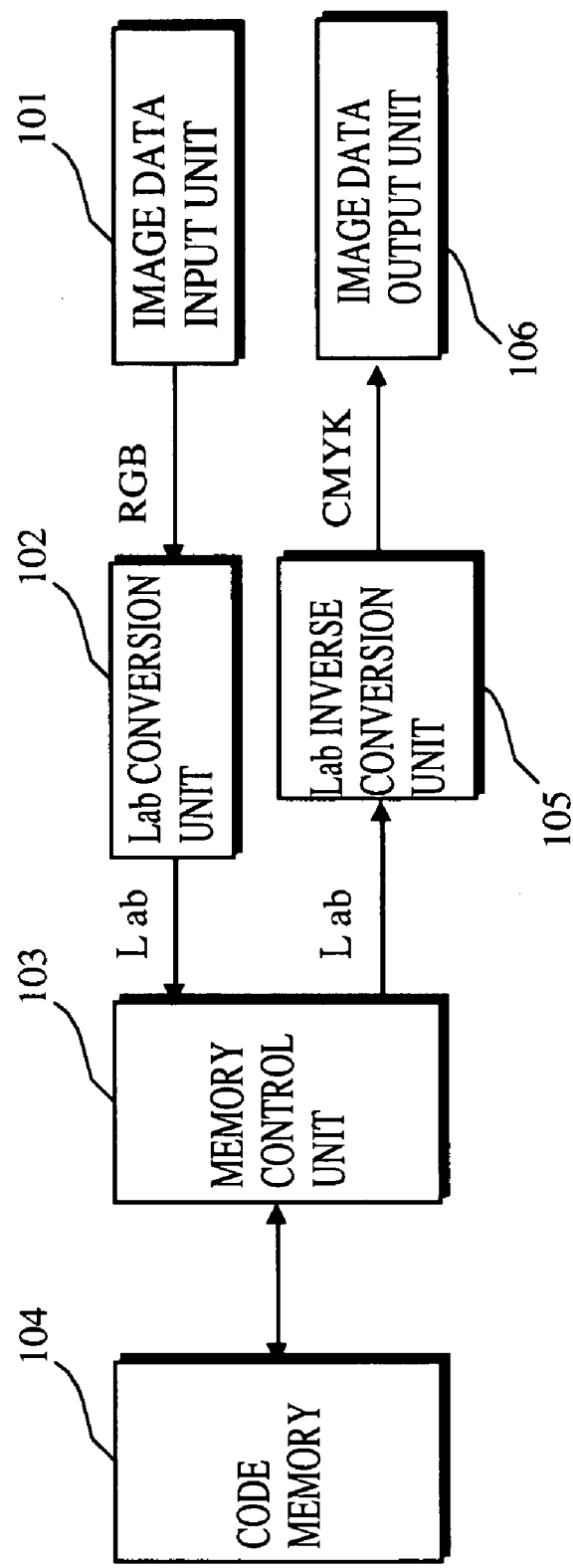
FIG. 3 is a functional block diagram showing a construction of an image data coding device relating to a first embodiment of the present invention.

The following describes the construction of the image data coding device to which the present invention relates. As described above, the image data coding device is included in the control unit 100 by which its operations are controlled. FIG. 3 is a functional block diagram showing the construction of the image data coding device relating to the present embodiment. As shown in the figure, the image data coding device is roughly composed of an image data input unit 101, a Lab conversion unit 102, a memory control unit 103, a code memory 104, a Lab inverse conversion unit 105, and an image data output unit 106.

The image data input unit 101 receives input of RGB data generated by the image scanning unit 11. The Lab conversion unit 102 performs well-known uniform color space conversion on the RGB data, to convert the RGB data into Lab data that is data expressed in the L*a*b* color system. Here, the coordinate axes in the coordinate system of the L*a*b* color system are respectively referred to as "L", "a", and "b". Also, the present embodiment assumes that brightness data ("L" coordinates) and the first color data ("a" coordinates) and the second color data ("b" coordinates) are each expressed by 8 bits, and that the color data outputted by the Lab conversion unit 102 is expressed in the form (II) in FIG. 1.

The memory control unit 103 controls coding and decoding of the Lab data, and storing and reading of the coded data to and from the code memory 104. A detailed construction of the memory control unit 103 will be explained later. As examples, a memory such as a DRAM, or a storage unit such as a hard disc drive (HDD) can be used as the code memory 104.

The Lab inverse conversion unit 105 performs an well-known Lab inverse conversion process on the Lab data that has been read from the code memory 104 and decoded by the memory control unit 103, to convert the Lab data into RGB data. The Lab inverse conversion unit 105 also converts the RGB data into data of respective reproduction colors of C, M, Y, and (hereafter referred to as "CMYK data"). The CMYK data is outputted from the image data output unit 106, and transmitted to the print head unit 21 as described above.

Figure 4:
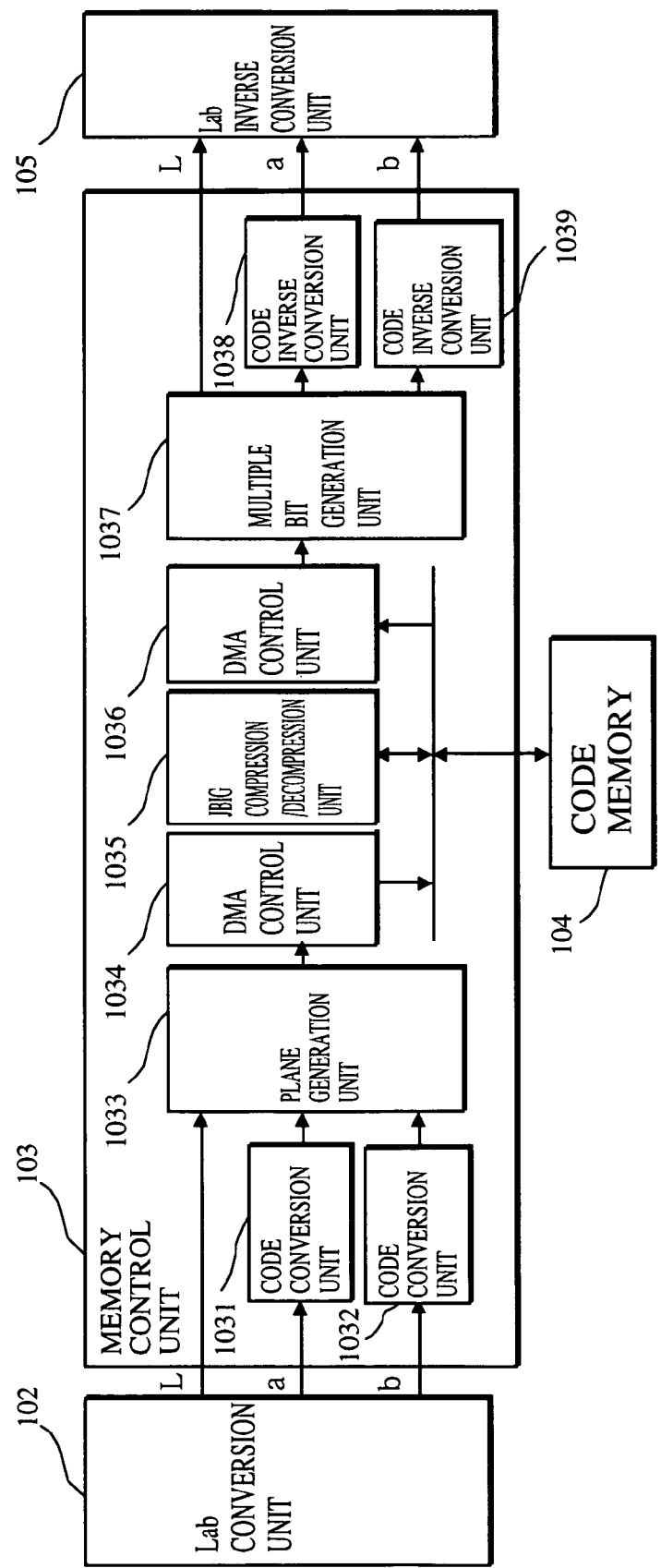
FIG. 4 is a functional block diagram showing a detailed construction of a memory control unit 103 in the first embodiment.

The following describes the detailed construction of the memory control unit 103. FIG. 4 is a functional block diagram showing the detailed construction of the memory control unit 103 in the present embodiment. The memory control unit 103 is roughly composed of code conversion units 1031 and 1032, a plane generation unit 1033, DMA control units 1034 and 1036, a JBIG compression/decompression unit 1035, a multiple-bit generation unit 1037, and code inverse conversion units 1038 and 1039.

Figure 5:
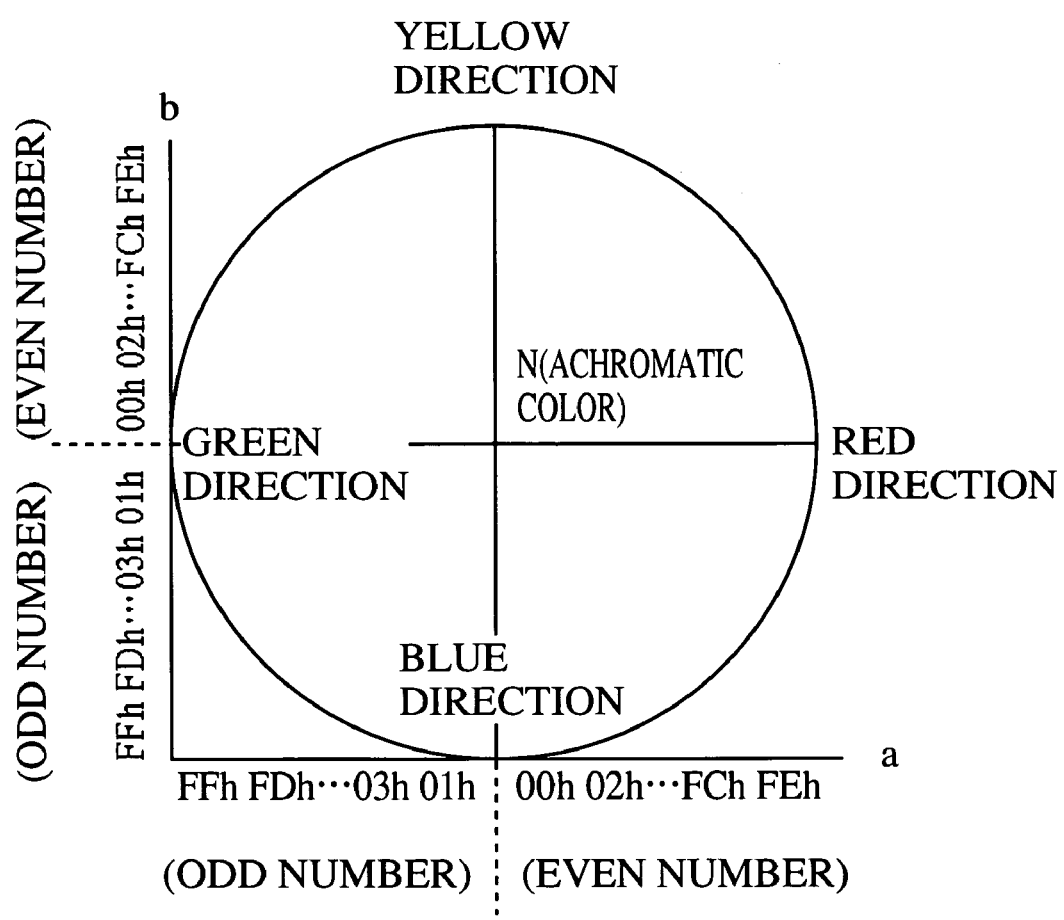
FIG. 5 is for explaining a code conversion process in the first embodiment.

The code conversion units 1031 and 1032 each have the same construction, and perform code conversion on the color data (a and b) of the Lab data generated by the Lab conversion unit 102 performing the Lab conversion on the RGB data, in such a manner that the values of the color data are converted into values that have appropriate relations with a reference color. The following describes the meaning of this code conversion process. FIG. 5 is for explaining the code conversion process in the present embodiment.

In the present embodiment, the code conversion units 1031 and 1032 convert the values of the color data (a and b), assuming achromatic color (the color at the position N) as a reference, into values that have differences corresponding to the distances away from the achromatic color. Explaining the values of the first color data (a) in more detail, the achromatic color is expressed by 00h (all 8 bits are 0), and larger even numbers are assigned to color data that have larger distances away from the achromatic color in the red direction, and larger odd numbers are assigned to color data that have larger distances away from the achromatic color in the green direction. As described above, the code conversion unit 1031 coverts the first color data (a) expressed in the form (II) in FIG. 1 into the values assigned as shown in FIG. 5.

Values are also assigned to the second color data (b) in the same manner. To be more specific, the achromatic color is expressed by 00h, and larger even numbers are assigned to color data that have larger distances away from the achromatic color in the yellow direction, and larger odd numbers are assigned to color data that have larger distances away from the achromatic color in the blue direction. As described above, the code conversion unit 1032 coverts the second color data (b) expressed in the form (II) in FIG. 1 into the values assigned as shown in FIG. 5.

With the code conversion described above, drastic decrease in the compression ratio of the entropy coding can be prevented as follows. Suppose an original document is a white recording sheet on which black colored characters are printed, and this original document is scanned by the image scanning unit 11. Even if chromatic color data is generated in a part where colors change from white to black, deterioration of the continuity of same values in color data can be reduced due to the above described code conversion. Accordingly, drastic decrease in the compression ratio of the entropy coding can be prevented.

Figure 1:
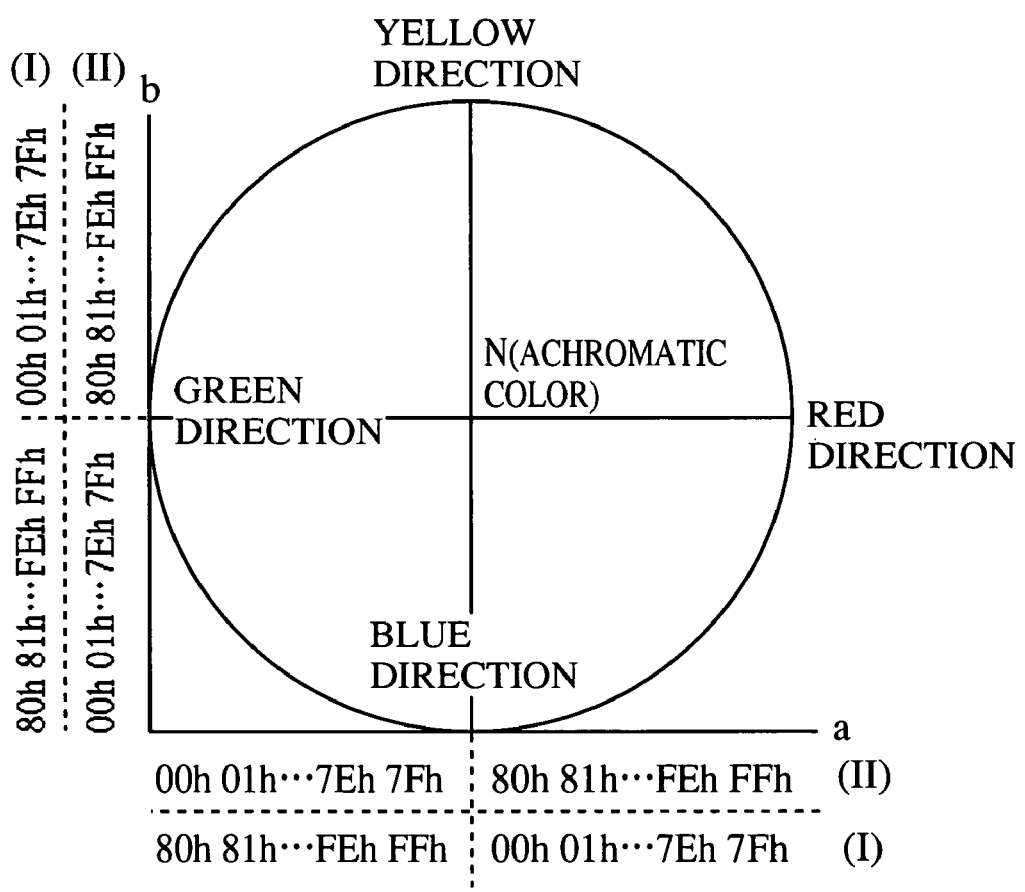
FIG. 1 is for explaining expressive forms of color data in conventional coding method of Lab.
Figure 6:
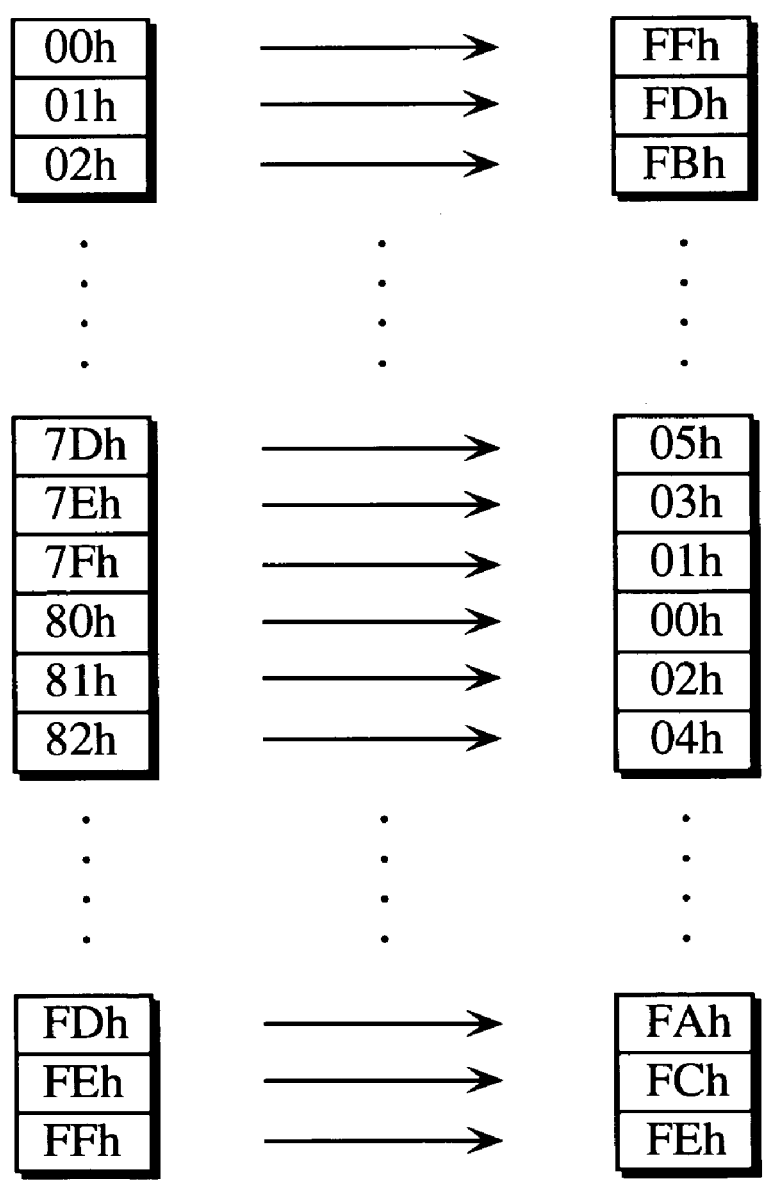
FIG. 6 shows an example of a conversion table showing contents of the code conversion performed by code conversion units 1031 and 1032 in the first embodiment.

Also, in the present embodiment, the Lab conversion unit 102 generates color data expressed in the form (II) in FIG. 1 as described above. Accordingly, the code conversion units 1031 and 1032 perform code conversion whose contents are shown in the conversion table in FIG. 6. Here, an explanation is given on the detailed construction of the code conversion units 1031 and 1032. FIG. 7 shows an example of the construction of the code conversion unit 1031 (the code conversion unit 1032 has the same construction).

As shown in the figure, the code conversion unit 1031 in the present embodiment can be realized by an arithmetic circuit with a simple construction including an inverter circuit 201 and an eight-bit selector 202. The first bit (D_IN[7]) out of the eight bits (D_IN[0] to D_IN[7]) of the color data (a) that has been transferred from the Lab conversion unit 102 is inputted into a select signal terminal (S) in the eight-bit selector 202. When the value of the first bit inputted into the select signal terminal (S) is "0", A0 to A7 are outputted as outputs (D_OUT[0] to D_OUT[7]). When the value of the first bit inputted into the select signal terminal (S) is "1", B0 to B7 are outputted as outputs (D_OUT[0] to D_OUT[7]). Note that a value "1" is inputted into the terminal A0 and a value "0" is inputted into the terminal B0 as a result of an every fixed value "0" having passed though the inverter circuit 201.

Data of L, a, and b are each inputted in pixel units from the Lab conversion unit 102 in synchronization with a clock signal. The input color data is subjected to real-time code conversion by the arithmetic circuits constituting the code conversion units 1031 and 1032. Note that the code conversion process is realized using the arithmetic circuits in the present embodiment, but it may instead be realized by software conversion using a conversion table.

Also, although the present embodiment describes the case where even numbers are assigned to the red and yellow directions, and odd numbers are assigned to the green and blue directions, the assignment of the even numbers and the odd numbers may be reversed, or the values to be assigned should not be limited to the even numbers and the odd numbers. For example, 00h, 03h, 04h, . . . may be assigned to the red (and yellow) direction, and 01h, 02h, 05h, . . . may be assigned to the green (and blue) direction. Furthermore, instead of data values expressed by multiple bits, for example, 00h, 02h, 08h, . . . may be assigned to the red (and yellow) direction, and 01h, 04h, 10h, . . . may be assigned to the green (and blue) direction, taking its bit arrangement into consideration. Various ways of assigning values can be considered to achieve the object of the present invention, which is to prevent drastic decrease in the compression ratio of the entropy coding when the above described deviation occurs in the color data.

The color data (a and b) on which the code conversion process has been performed and the brightness data (L) are inputted into the plane generation unit 1033. The plane generation unit 1033 is internally equipped with a buffer memory. In the present embodiment, the buffer memory has an enough capacity to store Lab data of at least one image. Eight-bit data of L, a, and b that each correspond to one pixel are sequentially stored into the buffer memory so that they are divided into planes. When Lab data of one image is stored in the buffer memory, each plane of the Lab data is transmitted to the JBIG compression/decompression unit 1035. The JBIG compression/decompression unit 1035 in the present embodiment is mainly constructed by a so-called QM coder, and performs an arithmetic coding process involving prediction using a template. The arithmetic coding process will not be explained in detail here since it is well-known.

To be more specific, the Lab data stored in the buffer memory is transferred to the JBIG compression/decompression unit 1035 in plane units by the DMA control unit 1034. The transferred Lab data is subjected to a JBIG compression process and then is stored in the code memory 104. As examples, two methods for the plane generation process can be considered. The following describes the two methods for the plane generation process.

Figure 8A:
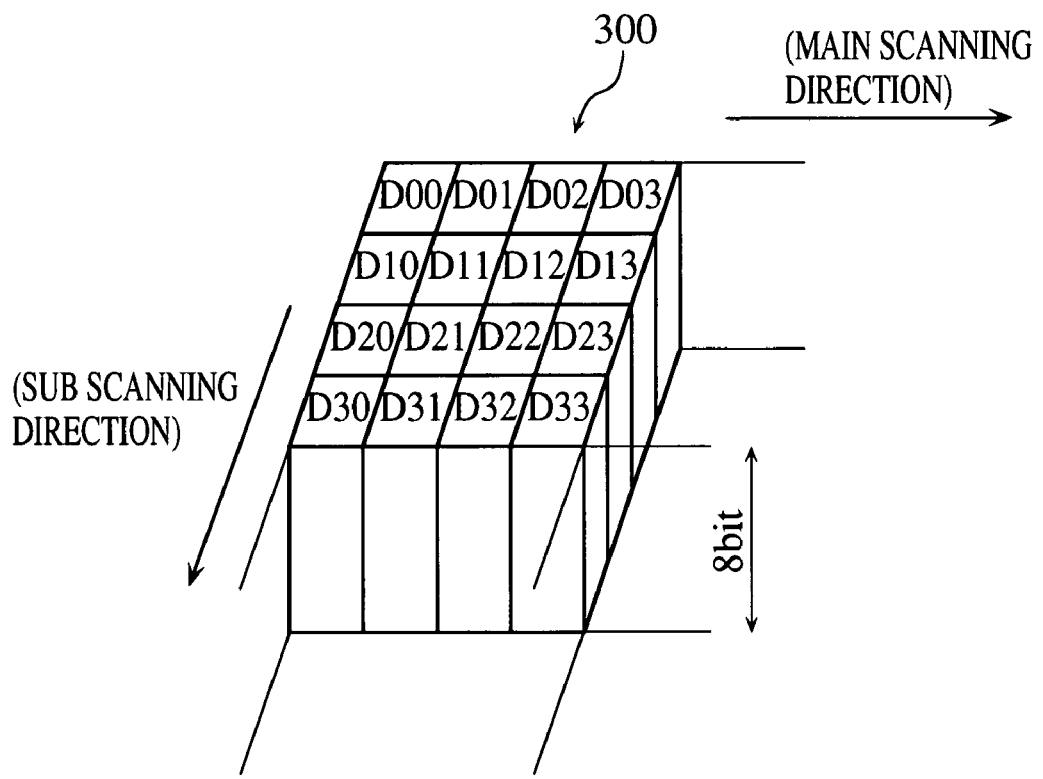
FIGS. 8A and 8B are for explaining a first method of a plane generation process.
Figure 8B:
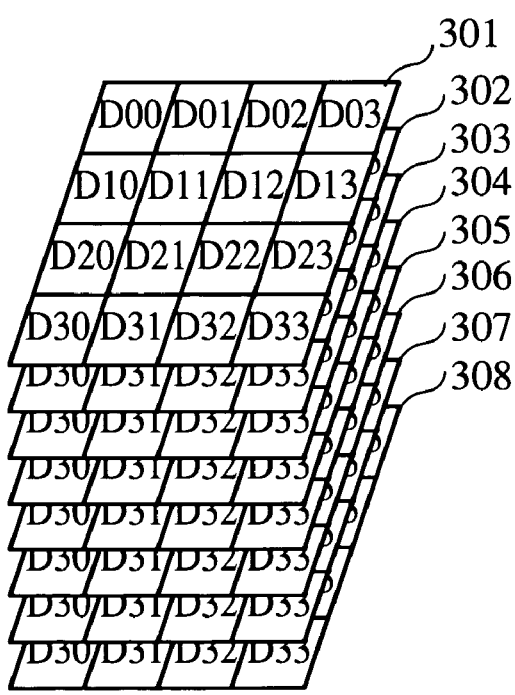

FIG. 8 is for explaining the first method for the plane generation process. FIG. 8A shows data of either L, a, or b. FIG. 8A shows a state where pixels each expressed by 8 bits of brightness data or color data are arranged in the main scanning direction and in the sub scanning direction. As one example, the following explains the case where FIG. 8A shows the brightness data (L), and the same explanation can also be applied to the color data (a and b). FIG. 8B shows planes resulting from the plane generation process with the first method. As shown in FIG. 8B, the first plane generation method is to generate so-called bit planes. The brightness data of one image is divided into bit planes, in such a manner that a bit plane 301 is made up of the first bit of every pixel that is expressed by 8 bits, and a bit plane 302 is made up of the second bit of every pixel that is expressed by 8 bits. The other bit planes are generated in the same manner. With this process, eight bit planes are generated from the brightness data of one image that is expressed by 8 bits per pixel. Bit planes are also generated in the same manner from each of the color data (a) and (b). Eventually, 24 bit planes are generated in total. Each generated bit plane is transmitted to the JBIG compression/decompression unit 1035, coded, and stored in the code memory 104.

Figures 9A, 9B:
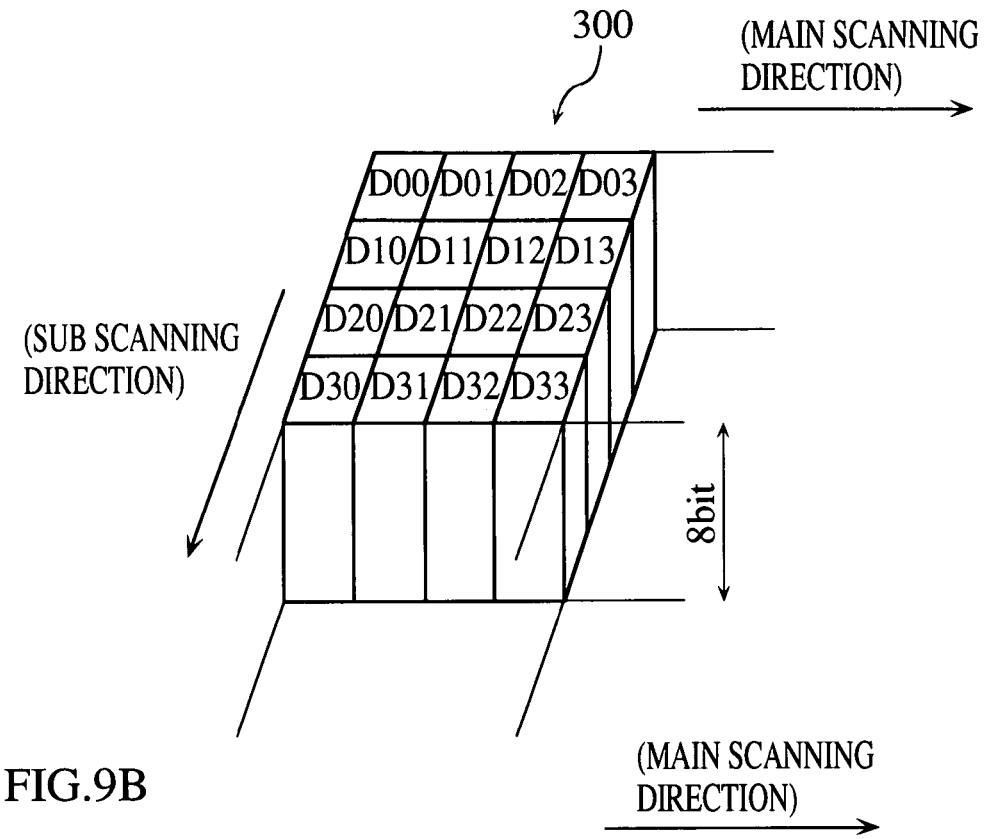
FIGS. 9A and 9B are for explaining a second method of the plane generation process.

FIG. 9 is for explaining the second method of the plane generation process. FIG. 9A is identical to FIG. 8A. The following describes the case where FIG. 9A shows the brightness data (L) as one example. FIG. 9B shows a plane resulting from the plane generation process with the second method. As shown in FIG. 9B, the second plane generation method is to generate a single plane 310 by sequentially arranging pixels each expressed by 8 bits of the brightness data of one image on a single two-dimensional plane. With this process, the single plane is generated from the brightness data of one image that is expressed by 8 bits per pixel. A single plane is also generated in the same manner from each of the color data (a) and (b). Eventually, three planes are generated in total. The processing following the generation of the planes is the same as with the first method.

Since the code conversion has been performed on the color data in the present embodiment as described above, when the plane generation process is performed with either the above first method or the second method, the compression ratio of the color data can be prevented from decreasing drastically, compared with a conventional case. To be more specific, even if chromatic color data is generated in a part where colors change from white to black or the like, the drastic decrease of the compression ratio can be prevented. Therefore, the storage capacity of the code memory 104 can be utilized effectively. Here, although the present embodiment describes the case where the image data is coded by the arithmetic coding, other entropy coding, such as MH coding, MR coding, and MMR coding may instead be used.

The following describes a decoding process of the coded data stored in the code memory 104. The coded data stored in the code memory 104 is first subjected to a decompression process by the JBIG compression/decompression unit 1035, so that planes are reconstructed. The reconstructed planes are subjected to the processing reverse to the plane generation process descried above by the multiple-bit generation unit 1037 that is internally equipped with a buffer memory. As a result, the Lab data including the color data in the form converted by the code conversion units 1031 and 1032 can be reconstructed.

Following this, the brightness data (L) is transmitted to the Lab inverse conversion unit 105 as it is. The color data (a and b) are transmitted to the Lab inverse conversion unit 105 after being subjected to a code inverse conversion process by the code inverse conversion units 1038 and 1039. The code inverse conversion is the processing reverse to the processing performed by the code conversion units 1031 and 1032. The following describes the code inverse conversion process performed by the code inverse conversion units 1038 and 1039.

Figure 10:
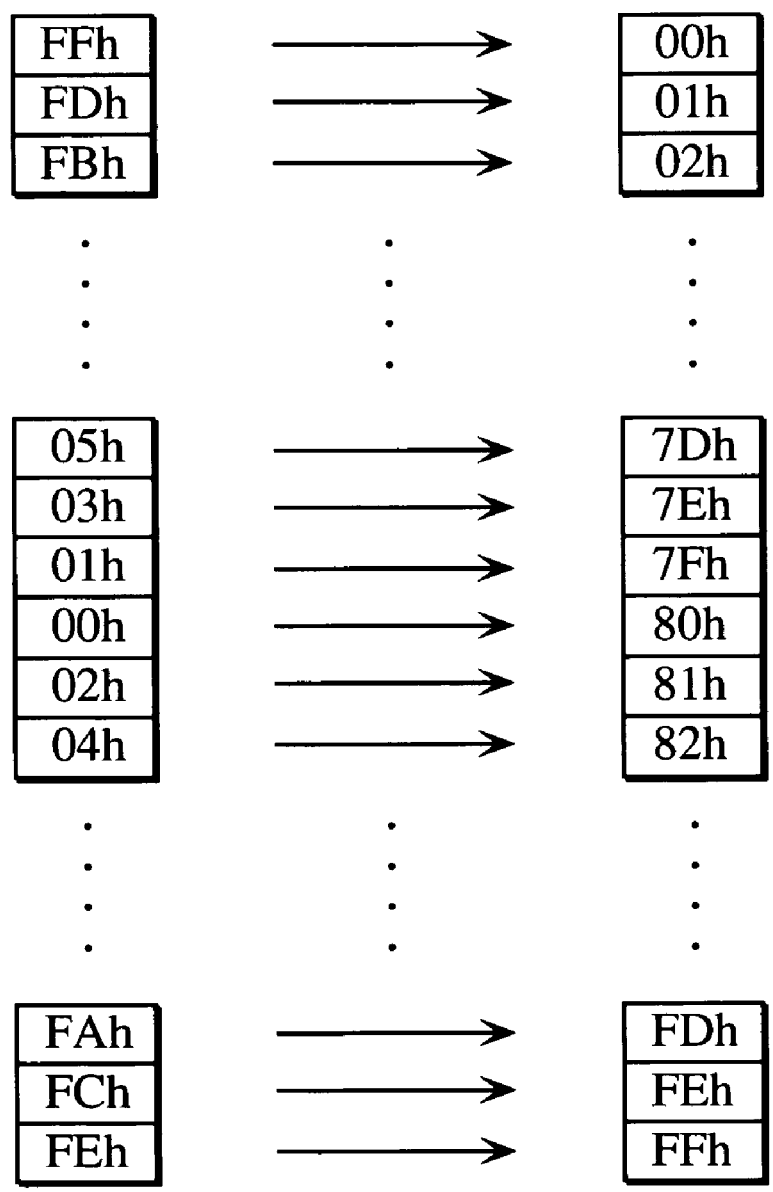
FIG. 10 is an example of a conversion table showing the contents of code inverse conversion performed by code inverse conversion units 1038 and 1039.

FIG. 10 is a conversion table showing the contents of the code inverse conversion performed by the code inverse conversion units 1038 and 1039. As shown in the figure, the code inverse conversion units 1038 and 1039 in the present embodiment reconstruct the color data expressed in the form (II) in FIG. 1 from the values resulting from the conversion by the code conversion units 1031 and 1032.

Figure 11:
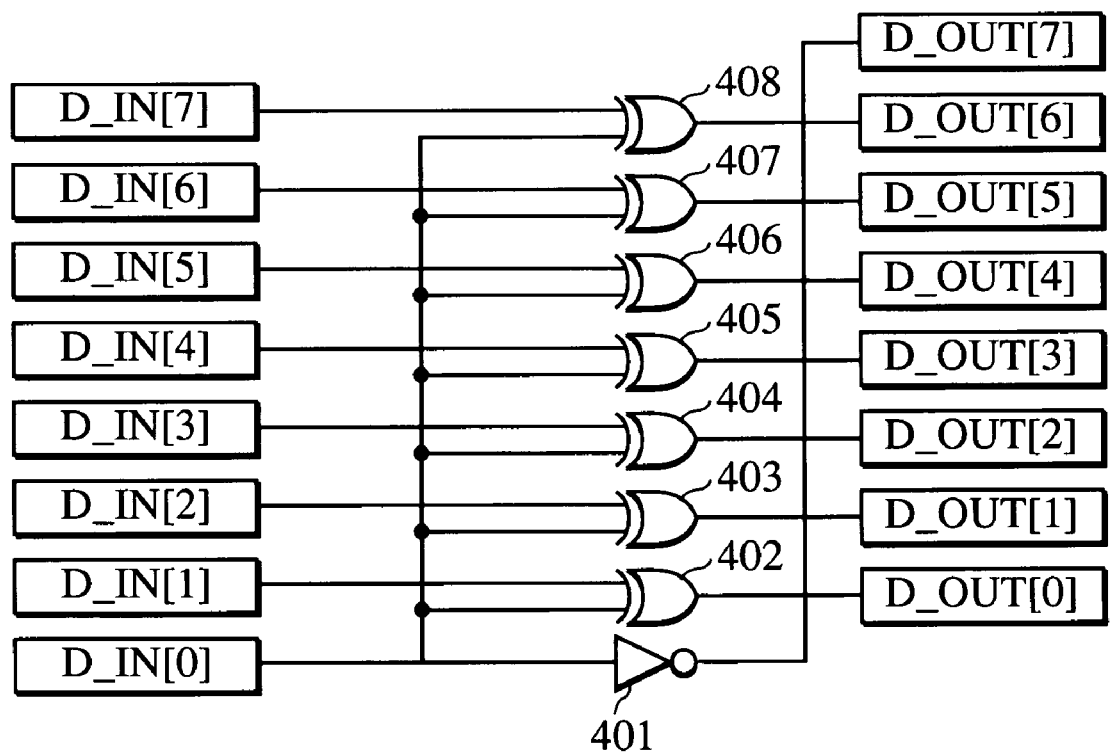
FIG. 11 shows an example of a construction of the code inverse conversion units 1038 and 1039 in the first embodiment.

FIG. 11 shows an example of the construction of the code inverse conversion units 1038 and 1039 in the present embodiment. The code inverse conversion units 1038 and 1039 each are roughly composed of an inverter circuit 401, and EXOR circuits 402 to 408. The sets of color data (D_OUT[0] to D_OUT[7]) that are expressed in the form (II) in FIG. 1 are reconstructed from the sets of color data (D_IN[0] to D_IN [7]) that have been subjected to the code conversion.

The outputs of the code inverse conversion units 1038 and 1039 are transmitted to the Lab inverse conversion unit 105 as the color data (a and b), and are subjected to the Lab inverse conversion by the Lab inverse conversion unit 105 to reconstruct the RGB data. The reconstructed RGB data is then converted into the CMYK data, and then is subjected to other well-known image processes. The resulting data is used to form an image.

As described above, with the use of the image data coding device relating to the present embodiment, drastic decrease in the compression ratio of the entropy coding can be prevented even if chromatic color data is generated in an achromatic color part due to the deviation in the alignment of the line sensors or the like. Accordingly, the storage capacity of the code memory 104 can be utilized effectively.

Second Embodiment

The following describes the second embodiment the present invention. In the first embodiment, achromatic color is set as the reference color. However, setting the achromatic color as the reference color might cause further decrease in the compression ratio. This happens in such a case where black colored characters are printed on a chromatic colored recording sheet. In view of this, the present embodiment proposes a method for preventing drastic decrease in the compression ratio even when the background of the recording sheet is colored with a chromatic color.

Figure 12:
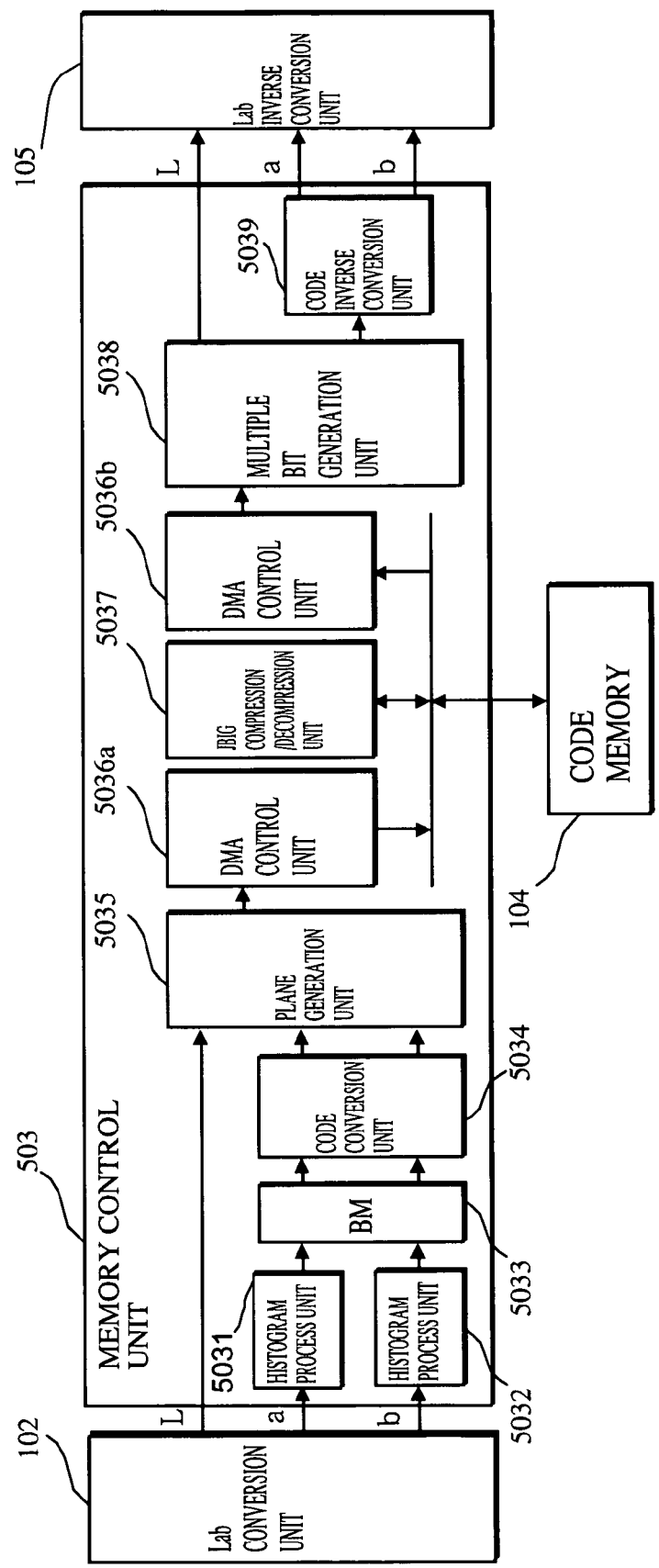
FIG. 12 is a functional block diagram showing a construction of a memory control unit 503 in a second embodiment of the present invention.

FIG. 12 shows a functional block diagram showing the construction of the memory control unit 503 in the present embodiment. The image data coding device in the present embodiment has the same construction as the image data coding device in the first embodiment with the only difference being in the construction of the memory control unit. Therefore, the present embodiment will be explained focusing only on this different point and the components that are the same as in the first embodiment will not be explained.

As shown in FIG. 12, the memory control unit 503 is roughly composed of histogram process units 5031 and 5032, a buffer memory ("BM" in the figure) 5033, a code conversion unit 5034, a plane generation unit 5035, DMA control units 5036a and 5036b, a JBIG compression/decompression unit 5037, a multiple-bit generation unit 5038, and a code inverse conversion unit 5039.

The histogram process units 5031 and 5032 obtain a histogram for each of color data (a) and color data (b) of the Lab data obtained by the Lab conversion unit 102, and determine the reference value for use in the code conversion of this color data. The present embodiment differs from the first embodiment in this determination of the reference value by the histogram process. The following describes the histogram process and the determination of the reference value in more detail.

Figure 13A:
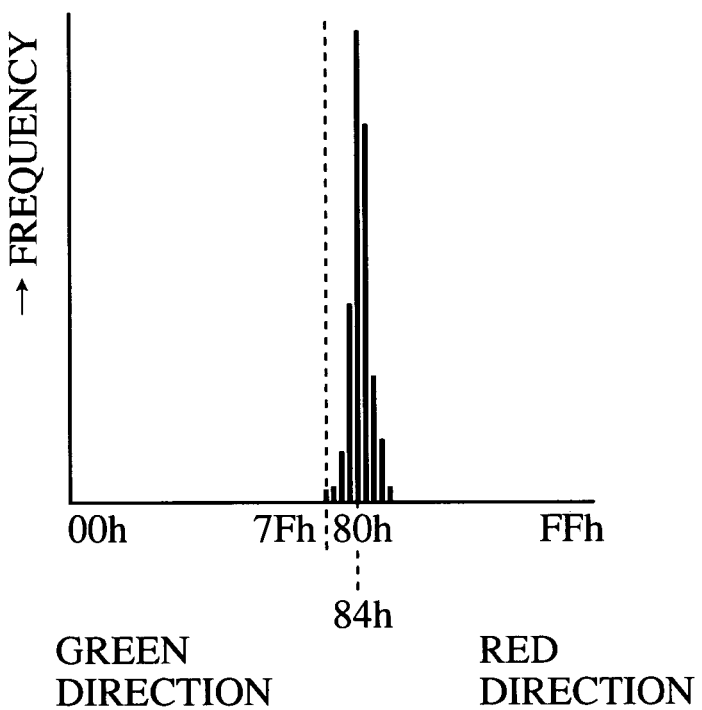
FIGS. 13A and 13B each show an example of a histogram for color data.
Figure 13B:
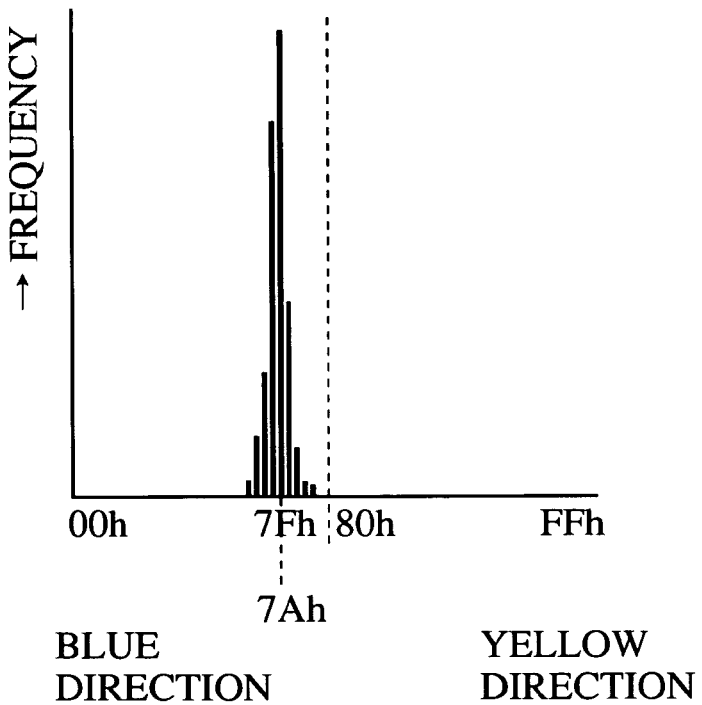
Figure 14:
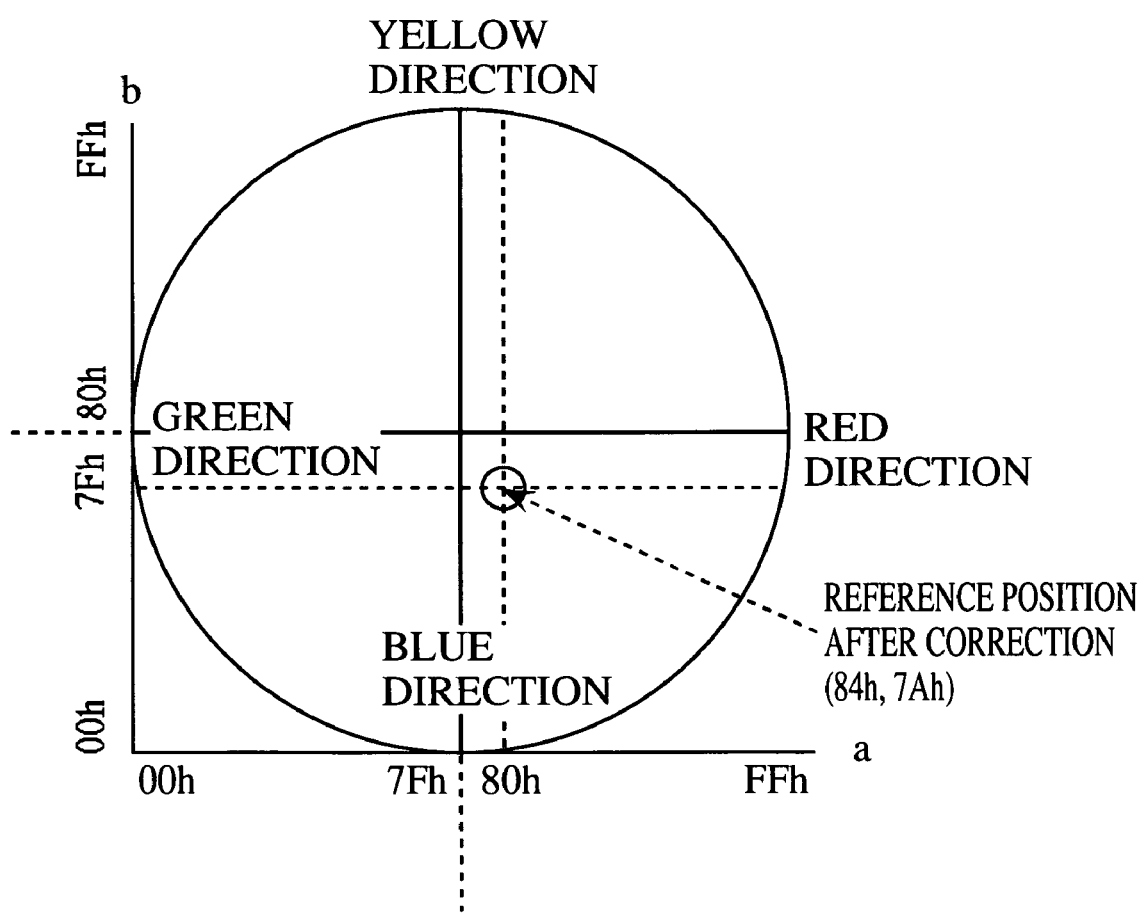
FIG. 14 is for explaining correction of a reference color.

FIGS. 13A and 13B each show an example of a color data histogram. FIG. 13A is an example of a histogram of the color data (a), and FIG. 13B is an example of a histogram of the color data (b). In FIGS. 13A and 13B, coordinates on the horizontal axis show values of the color data included in one image. The values of the color data are expressed in the form (II) in FIG. 1. Coordinates on the vertical axis show the frequency of these values. It can be seen from the histograms in FIGS. 13A and 13B that the value "84h" for the color data (a) and the value "7Ah" for the color data (b) are values with the highest frequency in the present embodiment. Therefore, these values are considered as the color data of the background color. The reference color is determined accordingly, and corrected as shown in FIG. 14.

Figure 15:
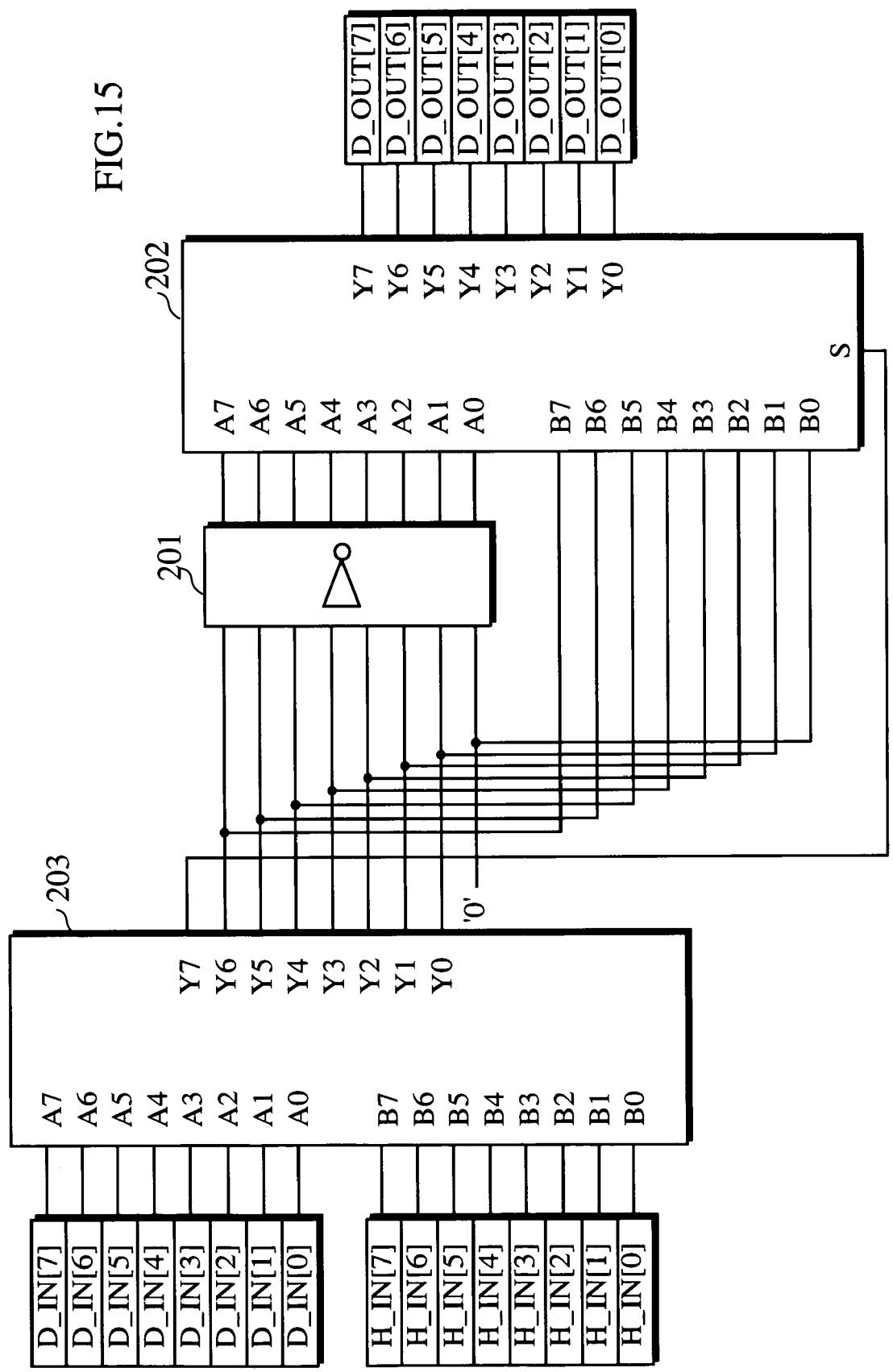
FIG. 15 shows an example of a construction of an arithmetic circuit included in a code conversion unit 5034 in the second embodiment.

The color data after completing the histogram process and the determined reference value are once stored in the buffer memory 5033, and then subjected to the code conversion by the code conversion unit 5034. It should be noted that FIG. 12 shows the code conversion unit 5034 as one unit, but actually, the code conversion unit 5034 includes two sets of arithmetic circuits respectively for the color data (a) and the color data (b) as in the first embodiment. FIG. 15 shows an example of the construction of one of the arithmetic circuits included in the code conversion unit 5034. As shown in the figure, the code conversion unit 5034 has the same construction as the code conversion unit 1031 in the first embodiment with which an eight-bit adder 203 is additionally provided for correcting values of the color data in accordance with the determined reference value.

The eight-bit adder 203 has such a construction that receives input of values of the sets of color data (D_IN[0] to D_IN[7]) outputted by the Lab conversion unit 102 and input of complements of the determined reference value (H_IN[0] to H_IN[7]) (a circuit for the complements is not illustrated). The actual operation of the eight-bit adder 205 is to subtract a value of the reference value from each value of the color data. By adding the corrected value of the reference value during the code inverse conversion as will be described later, the color data can be reconstructed.

Figure 16:
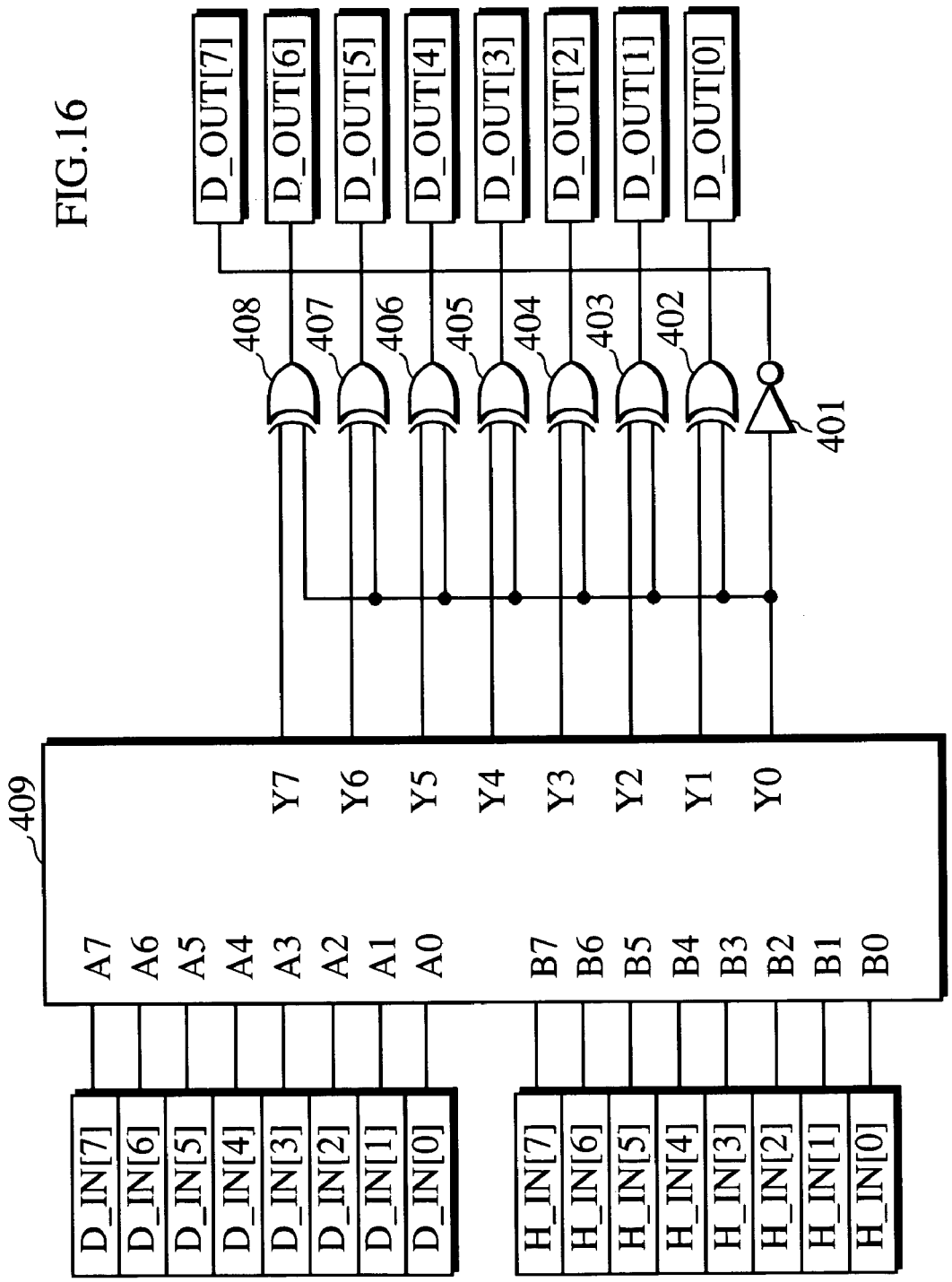
FIG. 16 shows an example of a construction of the arithmetic circuit included in a code inverse conversion unit 5039 in the second embodiment.

The operations of the plane generation unit 5035, the DMA control units 5036a and 5036b, the multiple-bit generation unit 5038 are the same as in the first embodiment, and so are not explained here. The following describes the construction of the code inverse conversion unit 5039. FIG. 16 shows an example of the construction of the code inverse conversion unit 5039. It should be noted that FIG. 12 shows the code inverse conversion unit 5039 as one unit, but actually, the code inverse conversion unit 5039 includes two sets of arithmetic circuits respectively for the color data (a) and the color data (b) as is the case with the code conversion unit 5034.

As described above, the code inverse conversion unit 5039 has the same construction as the code inverse conversion unit 1038 in the first embodiment with which the eight-bit adder 409 is additionally provided for adding the corrected reference value to the values of the color data. Here, not the complements of the corrected reference value but the reference value itself is inputted as the inputs (H_IN[0] to H_IN[7]). Using the input reference value, the inverse conversion is performed and the color data (a and b) expressed in the form (II) shown in FIG. 1 can be reconstructed. It should be noted here that a conversion table may be used as the code conversion unit 5034 and the code conversion unit 5039 instead of the arithmetic circuits as in the first embodiment.

As described above, for the image data coding device in the present embodiment, the reference color can be selected depending on an image to be coded. Therefore, the image data coding device in the present embodiment can produce the effect of preventing drastic decrease in the compression ratio of the entropy coding not only when the above described problem occurs in parts where colors change from white to black or the like, but also when a chromatic colored recording sheet is used.

<Modifications>

Although the present invention has been described based on the above embodiments, the invention should not be limited to such. For instance, the following modifications are possible.

(1) Although the above embodiment describes the case where the present invention is applied to the copying machine 1 that includes the image scanning unit 11 for scanning an original document using line sensors, the present invention can also be applied to an image forming apparatus that does not include the image scanning unit 11. To be more specific, the entropy coding of the color data expressed in such a form that is specifically described in the above embodiments can be applied to the image forming apparatus that does not include the image scanning unit. In the above embodiments, the color data is converted into converted data whose condition has a difference corresponding to the distance away from the reference color, with setting the condition of the reference color at maximum or minimum at least in a predetermined range including the reference color. Therefore, in a case where an image scanned by a scanner connected via a network is formed, the present invention can produce the effect of preventing drastic decrease in the compression ratio caused by a disturbed RGB balance. Also, in a case where an image is formed based on image data transmitted by a computer or an image recorded by a digital camera, the coding method of the present invention produces the effect of improving the compression ratio. Though the degree of the effect might depend on a property of an image, the present invention can at least produce a certain effect of improving the compression ratio of the entropy coding of any image, by converting the image into the color data expressed in the form described above. Accordingly, the storage capacity of the storage unit such as the code memory for storing the data coded in this way can be utilized effectively.

(2) Also, the image data coding method relating to the present invention may be realized by a general computer by installing a program to realize the method. The program can be recorded on a storage medium. The storage medium may be a disc medium such as a floppy disc, a CD-ROM, and a DVD-ROM, or may be various other medium such as a memory card. Also, the program recorded on the storage medium such as a RAM may be transmitted to another computer via a network, so that the program is realized by the other computer.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image data coding device, comprising:
a data converting unit for converting color data that is contained in image data, into converted color data that corresponds to a difference from a reference color; and
a coding unit for performing entropy coding on the converted color data in which the color data has been converted by the data converting unit
wherein the coding unit
(a) generates bit planes for the converted color data that has been converted by the data converting unit, by dividing bits of pixels showing the converted color data in such a manner that each bit plane is composed of values of bits at a different bit position, and
(b) performs the entropy coding on the converted color data in units of the generated bit planes.

2. The image data coding device of claim 1,
wherein the converted color data is made up of color data and brightness data, and
the image data coding device further comprises
a color space converting unit for converting original image data that is made up of a plurality of color components, into the converted color data.

3. The image data coding device of claim 2,
wherein the original image data is made up of the color components of red, green, and blue, and
the image data is expressed by coordinate values in the L*a*b* color system.

4. The image data coding device of claim 1,
wherein the data converting unit includes a determining unit for determining the reference color using the color data that has yet to be converted.

5. The image data coding device of claim 1, wherein the reference color is an achromatic color.

6. The image data coding device of claim 1, wherein the data converting unit converts the color data based on a difference between a single reference color.

7. The image data coding device of claim 6, wherein the reference color is an achromatic color.

8. An image data coding device comprising:
a data converting unit for converting color data that is contained in image data, into converted color data that corresponds to a difference from a reference color; and
a coding unit for performing entropy coding on the converted color data in which the color data has been converted by the data converting unit,
wherein the coding unit
(a) generates a plane for the converted color data that has been converted by the data converting unit, by arranging values of bits of pixels showing the converted color data on a two-dimensional plane, and
(b) performs the entropy coding on the converted color data in a form of the generated plane.

9. The image data coding device of claim 8,
wherein the converted color data is made up of color data and brightness data, and
the image data coding device further comprises
a color space converting unit for converting original image data that is made up of a plurality of color components, into the converted color data.

10. The image data coding device of claim 9,
wherein the original image data is made up of the color components of red, green, and blue, and
the image data is expressed by coordinate values in the L*a*b* color system.

11. The image data coding device of claim 8,
wherein the data converting unit includes a determining unit for determining the reference color using the color data that has yet to be converted.

12. The image data coding device of claim 8, wherein the reference color is an achromatic color.

13. The image data coding device of claim 8, wherein the data converting unit converts the color data based on a difference between a single reference color.

14. The image data coding device of claim 13, wherein the reference color is an achromatic color.

15. An image data coding device, comprising:
image data input means for receiving input of first-type color image data;
image data converting means for converting the input first-type color image data into second-type color image data that contains brightness data and color data, where a difference between a condition of the color data and a condition of data for a reference color corresponds to a difference between a color expressed by the color data and the reference color, the condition of the data for the reference color being set at maximum or minimum at least in a predetermined range including the reference color; and
coding means for performing entropy coding on the second-type color image data.

16. An image data coding device, comprising:
an image data input device for receiving input of first-type color image data;
an image data converting device for converting the input first-type color image data into second-type color image data that contains brightness data and color data, where a difference between a condition of the color data and a condition of data for a reference color corresponds to a difference between a color expressed by the color data and reference color, the condition of the data for the reference color being set at maximum or minimum at least in a predetermined range including the reference color; and
a coding device for performing entropy coding on the second-type color image data.

* * * * *